(12) United States Patent
You

(10) Patent No.: US 6,383,588 B1
(45) Date of Patent: May 7, 2002

(54) FISHING ROD MADE OF COMPOSITE MATERIAL AND HAVING WOODY TEXTURE AND EXCELLENT MECHANICAL PROPERTY

(76) Inventor: Chin-San You, No. 6, Lane 477, Sec. 2, Feng-Shyn Rd., Feng Yuan City, Taichung Hsien (TW)

( * ) Notice: Subject to any disclaimer, the term of this patent is extended or adjusted under 35 U.S.C. 154(b) by 0 days.

(21) Appl. No.: 09/186,379

(22) Filed: Nov. 5, 1998

(51) Int. Cl.[7] .......................... B29D 22/00; B32B 17/08; B32B 21/04; A01K 87/00
(52) U.S. Cl. ................. 428/36.91; 428/438; 428/537.1; 43/18.1; 43/18.5; D22/137; D22/142
(58) Field of Search ............................... 428/34.5, 34.6, 428/36.9, 36.91, 36.3, 438, 439, 537.1, 688, 293.4, 541; 43/18.1, 18.5; D22/137, 142

(56) References Cited

U.S. PATENT DOCUMENTS

| | | | | |
|---|---|---|---|---|
| 2,104,494 A | * | 1/1938 | O'Brien | 43/18 |
| 3,830,008 A | * | 8/1974 | Johnson | 43/18 R |
| 3,862,509 A | * | 1/1975 | Petersen, Jr. | 43/17.5 |
| 4,214,395 A | * | 7/1980 | Caldwell, Jr. | 43/18 R |
| 4,685,241 A | * | 8/1987 | Foote et al. | 43/18.5 |
| 4,885,865 A | * | 12/1989 | Rumbaugh | 43/18.5 |
| 4,957,883 A | * | 9/1990 | Kobayashi et al. | 501/35 |
| 4,968,545 A | * | 11/1990 | Fellman et al. | 428/36.1 |
| 5,195,267 A | * | 3/1993 | Daniels | 43/18.1 |
| 5,538,769 A | * | 7/1996 | Sandman, Jr. | 428/36.3 |
| 5,601,892 A | * | 2/1997 | McIntosh | 428/35.8 |

* cited by examiner

Primary Examiner—Rena L. Dye
Assistant Examiner—Michael C. Miggins
(74) Attorney, Agent, or Firm—Browdy and Neimark, P.L.L.C.

(57) ABSTRACT

A fishing rod consists of a body having a tapered and slender rod body of a composite material. The rod body is covered by a woody layer for providing the body with a woody texture and an excellent mechanical property.

8 Claims, 4 Drawing Sheets

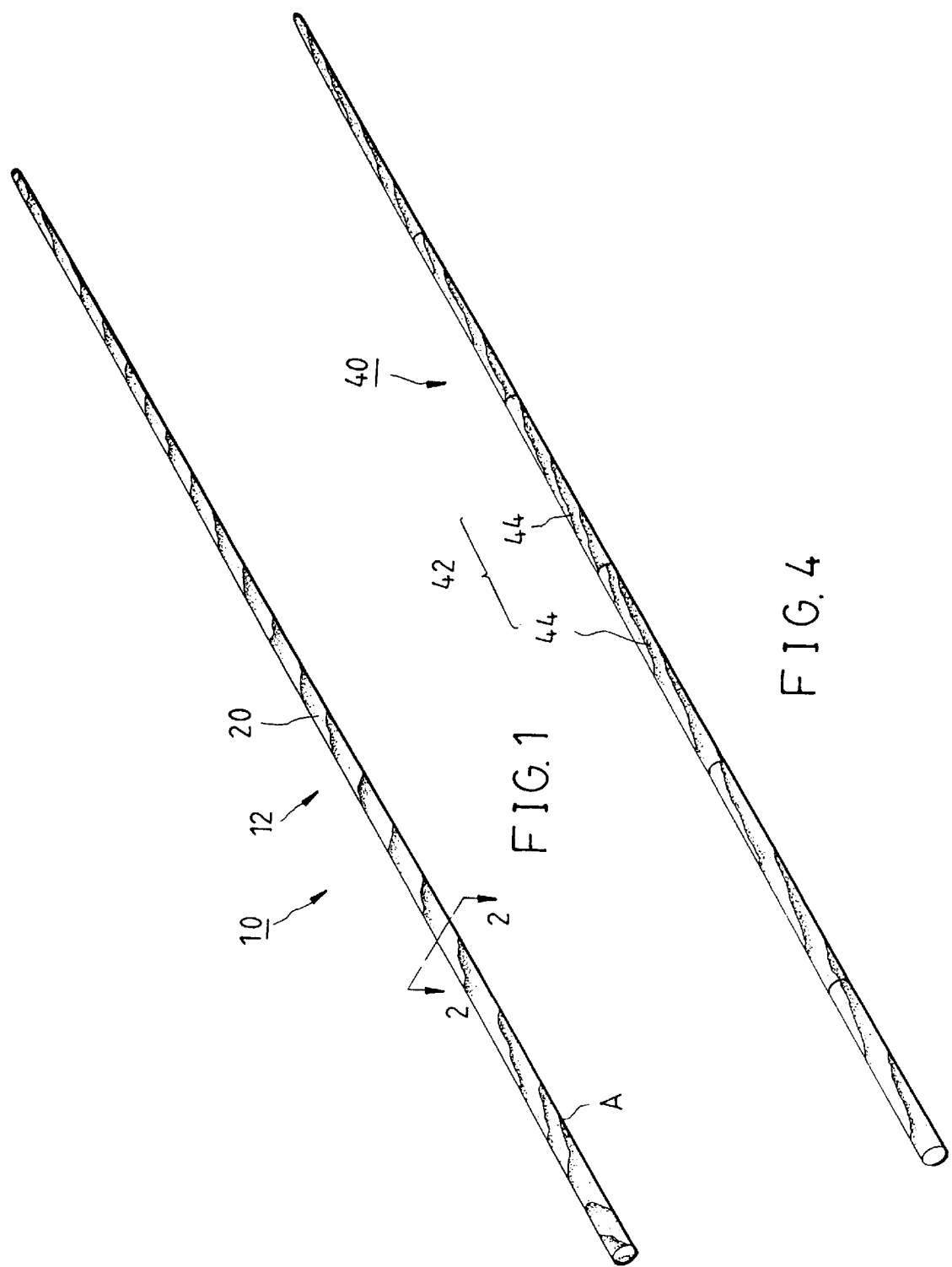

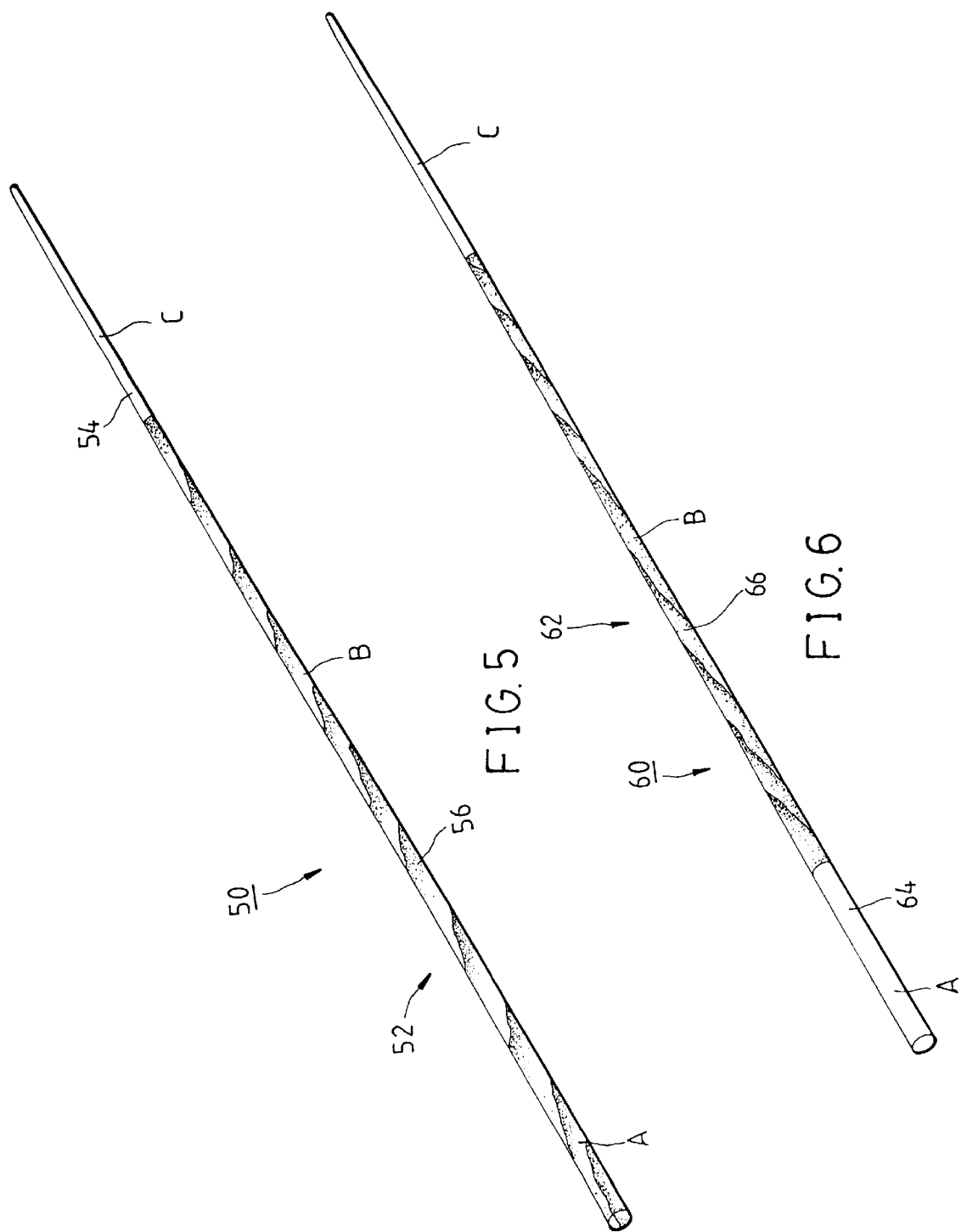

FISHING ROD MADE OF COMPOSITE MATERIAL AND HAVING WOODY TEXTURE AND EXCELLENT MECHANICAL PROPERTY

FIELD OF THE INVENTION

The present invention relates generally to a fishing gear, and more particularly to a fishing rod which is made of a composite material and provided with a woody texture and an excellent mechanical property.

BACKGROUND OF THE INVENTION

In order to conserve timber resources, the conventional fishing rods of a woody material have been replaced by those which are made of a carbon fiber or glass fiber composite material. In light of the carbon fiber composite material being conductive to electricity, the fishing rod of the carbon fiber composite material is prone to generate static electricity at the time when fishing rod is exposed to the thunder, thereby causing a person holding the fishing rod to have a feeling of electrical shock. In addition, fishing rods of composite materials are devoid of a woody texture and therefore reflect light. The reflection of light by the fishing rod can undermine the luring effect.

SUMMARY OF THE INVENTION

It is therefore the primary objective of the present invention to provide a fishing rod which is made of a composite material and provided with a woody texture and an excellent mechanical property for averting the generation of static electricity by the fishing rod.

It is another objective of the present invention to provide a fishing rod which is made of a composite material and provided with an excellent mechanical property and a woody texture for giving the fishing rod an added natural appearance.

It is still another objective of the present invention to provide a fishing rod which is made of a composite material and provided with an excellent mechanical property and a woody appearance incapable of reflecting light to undermine the effect of enticing the fish.

The foregoing objectives, features, functions and advantages of the present invention will be more readily understood upon a thoughtful deliberation of the following detailed description of the embodiments of the present invention with reference to the accompanying drawings.

BRIEF DESCRIPTION OF THE DRAWINGS

FIG. 1 shows a perspective view of the present invention.

FIG. 4 shows a perspective view of a third preferred embodiment of the present invention.

FIG. 5 shows a perspective view of a fourth preferred embodiment of the present invention.

FIG. 6 shows a perspective view of a fifth preferred embodiment of the present invention.

DETAILED DESCRIPTION OF THE INVENTION

Figure 2:
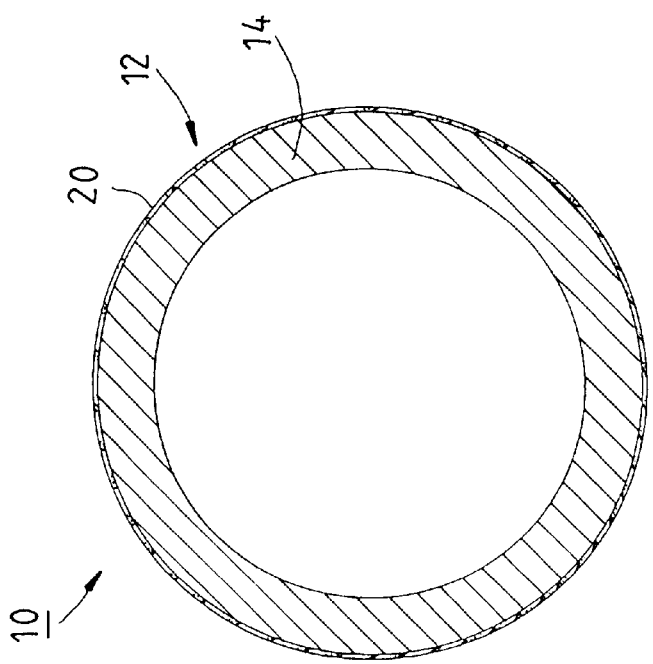
FIG. 2 shows a sectional view taken in the direction indicated by a line 2—2 as shown in FIG. 1.

As shown in FIG. 1, a fishing rod 10 embodied in the present invention is composed of a body 12 of a slender and tapered rod. The body 12 has a large diametrical end "A" serving as a hand grip. The body 12 is a finished product of a carbon fiber fabric plate and having a rod body 14 formed of the composite material, as shown in FIG. 2. The rod body 14 is either solid or hollow.

The present invention is characterized in design in that it consists of a woody layer 20 which is formed of a woody or bamboo film which is adhered to the surface of the rod body 14.

Figure 3:
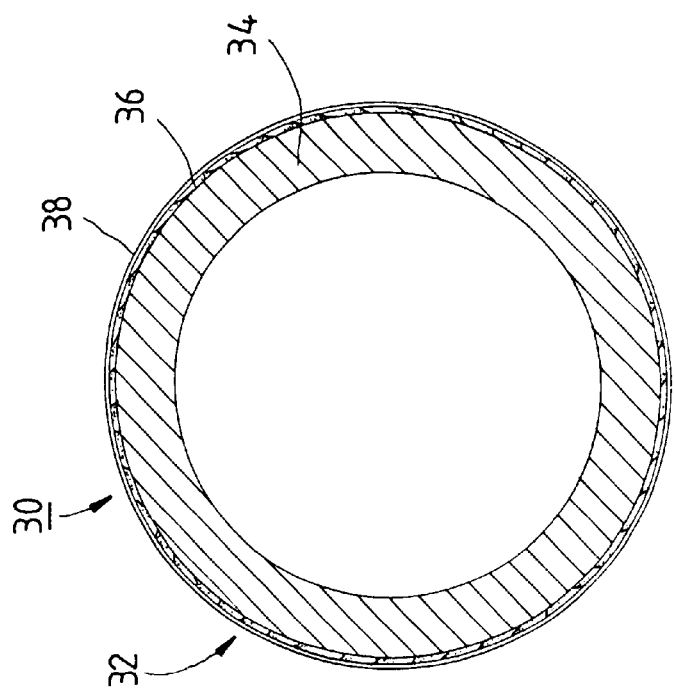
FIG. 3 shows a sectional view of a second preferred embodiment of the present invention.

As shown in FIG. 3, a fishing rod 30 of the second preferred embodiment of the present invention has a body 32, and a rod body 34 which is provided in the surface thereof with a woody layer 36 adhered thereto. The woody layer 36 is provided in the outer surface thereof with a transparent glass fiber layer 38 adhered thereto for protecting the woody layer 36. The glass fiber layer 38 is not an essential component.

As shown in FIG. 4, a fishing rod 40 of the third preferred embodiment of the present invention has a body 42 which is provided with a rod body having a plurality of segments made of a composite material and composed of tapered, segmented bodies 44 which are fastened end to end by means of tenons and mortises, bolts, or threads. The segmented bodies 44 can be thus connected or disconnected. The segmented bodies 44 are covered with a woody layer which is optionally covered with a glass fiber layer.

As shown in FIG. 5, a fishing rod 40 of the fourth preferred embodiment of the present invention is provided with a body 52 having a rod body 54 which is provided with a woody layer 56 such that the woody layer 56 covers only the large diametrical segment "A" and the intermediate segment "B" of the rod body 54, and that the woody layer 56 does not cover the small diametrical end "C" of the rod body 54.

As shown in FIG. 6, a fishing rod 60 of the fifth preferred embodiment of the present invention is provided with a woody layer 66 which covers only the intermediate segment "B" of the body 62 and does not cover the large diametrical end "A" and the small diametrical end "C" of the rod body 64.

Figure 7:
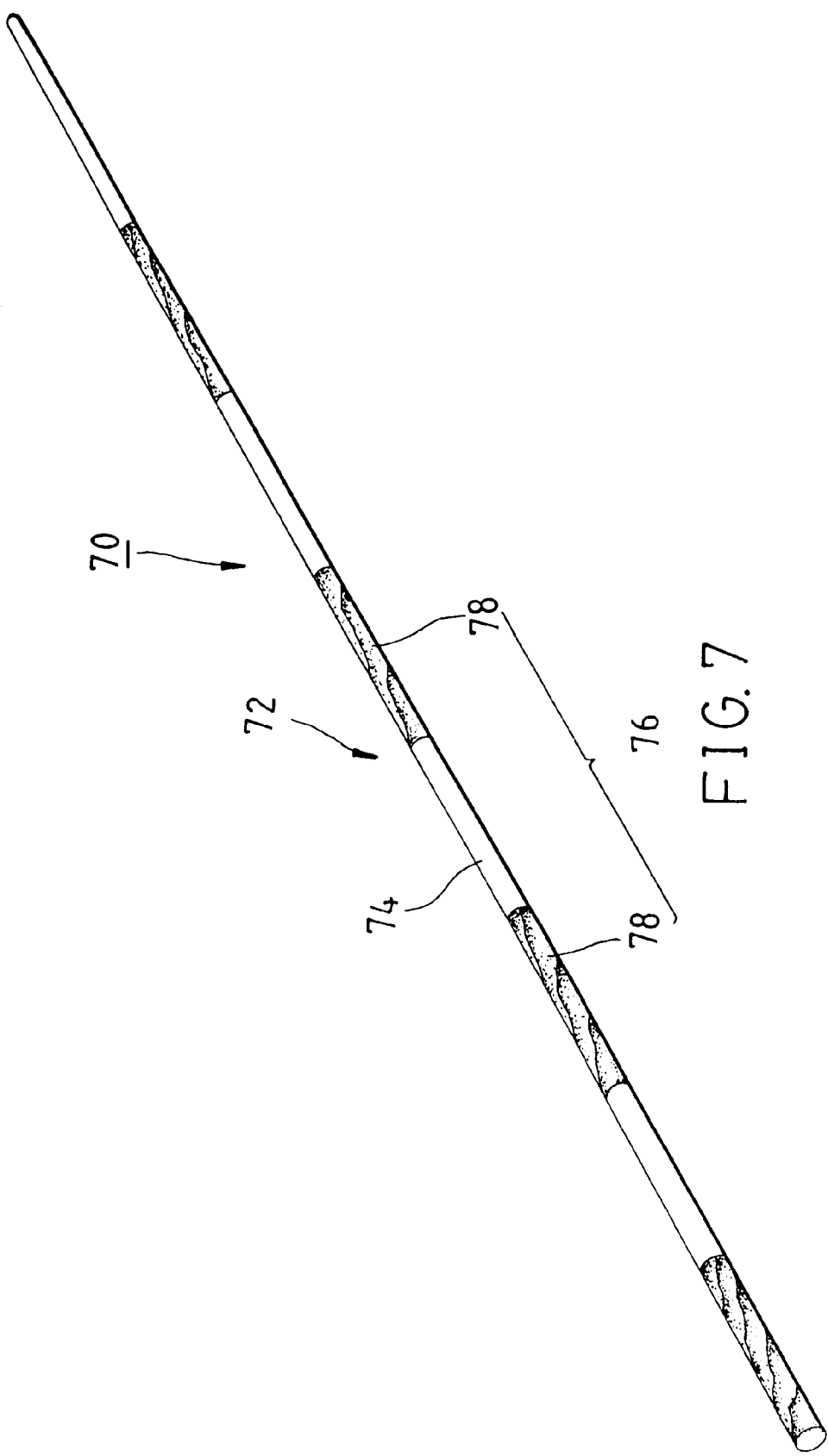
FIG. 7 shows a perspective view of a sixth preferred embodiment of the present invention.

As shown in FIG. 7, a fishing rod 70 of the sixth preferred embodiment of the present invention is composed of a body 72 having a rod body 74 which may be a single unit without being segmented, or formed of segments. The rod body 74 is covered by a woody layer 76 consisting of a plurality of woody layer segments 78 which cover the rod body 74 at an interval.

As shown in FIGS. 5, 6 and 7, the rod body may be covered with a glass fiber layer, regardless of the way by which the rod body is covered with the woody layer.

The functions intended to attain by the present invention are described hereinafter.

The fishing rod of the present invention is made of a carbon fiber composite material and is wrapped with a woody layer incapable of the static phenomenon. In addition, the body of the fishing rod of the present invention is covered with a glass fiber layer which is also incapable of the static phenomenon.

The fishing rod of the present invention is made of a composite material and is covered with a woody layer of natural appearance and incapable of reflecting light. As a result, the fishing rod of the present invention does not undermine the effect of luring the fish.

The fishing rod of the present invention is made of a composite material and is covered with a woody layer for giving the fishing rod a woody texture to enhance the marketability of the fishing rod of the present invention.

What is claimed is:

1. A fishing rod comprising a plurality of tapered segments made from a composite material, said plurality of segments being joined end to end by fastening means to form a tapered rod having a diameter at a first end which is larger than a diameter at a second end, wherein a wooden layer is engaged around a periphery of segments of said plurality of segments.

2. The fishing rod of claim 1 wherein said separate fastening means are tenons and mortises.

3. The fishing rod of claim 2 wherein said wooden layer is engaged to alternate segments of said plurality of segments.

4. The fishing rod of claim 2, wherein said wooden layer is engaged to each segment of said plurality of segments.

5. The fishing rod of claim 2, wherein a segment including the first end of the rod is not covered by said wooden layer.

6. The fishing rod of claim 2, wherein a segment including the second end of the rod is not covered by said wood layer.

7. The fishing rod of claim 2, wherein segments respectively having the first end and the second end of the rod are not covered by wooden layers.

8. The fishing rod of claim 2, wherein each wooden layer is covered by a transparent glass fiber layer.

* * * * *